US010989148B2

(12) United States Patent
Op De Beeck et al.

(10) Patent No.: US 10,989,148 B2
(45) Date of Patent: Apr. 27, 2021

(54) SYSTEM FOR STORING AN AQUEOUS SOLUTION ON-BOARD A VEHICLE

(71) Applicant: Plastic Omnium Advanced Innovation and Research, Brussels (BE)

(72) Inventors: Joel Op De Beeck, Lint (BE); Franck Dhaussy, Margny-les-Compiegne (FR); Stephane Leonard, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 16/349,879

(22) PCT Filed: Nov. 17, 2017

(86) PCT No.: PCT/EP2017/079641
§ 371 (c)(1),
(2) Date: May 14, 2019

(87) PCT Pub. No.: WO2018/091670
PCT Pub. Date: May 24, 2018

(65) Prior Publication Data
US 2020/0080520 A1   Mar. 12, 2020

(30) Foreign Application Priority Data

Nov. 17, 2016   (EP) .................................... 16199388

(51) Int. Cl.
*F02M 25/00* (2006.01)
*F02M 25/022* (2006.01)
(Continued)

(52) U.S. Cl.
CPC ......... *F02M 25/0224* (2013.01); *B60K 13/02* (2013.01); *F02B 47/02* (2013.01);
(Continued)

(58) Field of Classification Search
CPC ........... F02M 25/0224; F02M 25/0222; F02M 25/0225; F02M 25/0227; F02M 25/08;
(Continued)

(56) References Cited

U.S. PATENT DOCUMENTS 5,671,701 A * 9/1997 O'Donnell .............. F02B 47/02
123/25 A
2012/0020857 A1   1/2012 Isada et al.
(Continued)

FOREIGN PATENT DOCUMENTS

DE   10 2006 061 734 A1   7/2008
DE   10 2007 061 808 A1   6/2009
(Continued)

OTHER PUBLICATIONS

International Search Report dated Jan. 23, 2018 in PCT/EP2017/079641 filed on Nov. 17, 2017.
(Continued)

*Primary Examiner* — Syed O Hasan
(74) *Attorney, Agent, or Firm* — Oblon, McClelland, Maier & Neustadt, L.L.P.

(57) ABSTRACT

A vehicle system storing an aqueous solution includes: a first compartment; a second compartment; a module that includes a feed pump unit connected for pumping aqueous solution from the first compartment to a feed outlet; and a jet pump having a suction inlet, a pressure inlet and an outlet. The feed pump unit is further connected for pumping aqueous solution along a flow path from the first compartment through the feed pump unit, through the pressure inlet of the jet pump to the outlet of the jet pump. A heater heats the flow path. The suction inlet is connected to a suction line that receives the aqueous solution from the second compartment. The
(Continued)

outlet of the jet pump returns aqueous solution from the suction inlet and from the pressure inlet to the first compartment.

26 Claims, 10 Drawing Sheets

(51) Int. Cl.
| | | |
|---|---|---|
| *B60K 13/02* | (2006.01) | |
| *F02M 25/028* | (2006.01) | |
| *F02M 25/03* | (2006.01) | |
| *F02M 35/10* | (2006.01) | |
| *F02B 47/02* | (2006.01) | |
| *B60K 11/02* | (2006.01) | |

(52) U.S. Cl.
CPC ...... *F02M 25/028* (2013.01); *F02M 25/0222* (2013.01); *F02M 25/0225* (2013.01); *F02M 25/0227* (2013.01); *F02M 25/03* (2013.01); *F02M 35/10209* (2013.01); *B60K 11/02* (2013.01)

(58) Field of Classification Search
CPC ............. F02M 25/03; F02M 35/10209; F02M 25/0228; F02M 25/0221; F02B 47/02; B60K 13/02
See application file for complete search history.

(56) References Cited

U.S. PATENT DOCUMENTS

| | | | |
|---|---|---|---|
| 2012/0047880 A1 | | 3/2012 | Leonard et al. |
| 2012/0311999 A1* | | 12/2012 | Hodgson ............... F01N 3/2066 60/295 |
| 2013/0233850 A1* | | 9/2013 | Treudt ................... F02M 37/22 220/4.14 |
| 2016/0138537 A1 | | 5/2016 | Braun et al. |

FOREIGN PATENT DOCUMENTS

| | | | | |
|---|---|---|---|---|
| DE | 102007061808 | * | 6/2009 | ........... F01N 3/2066 |
| DE | 10 2013 212 267 A1 | | 12/2014 | |
| DE | 10 2014 222 471 A1 | | 5/2016 | |
| DE | 10 2015 205 499 A1 | | 9/2016 | |
| EP | 2419611 | * | 4/2010 | ............. F01N 3/208 |
| EP | 2 419 611 A2 | | 2/2012 | |
| EP | 2 453 115 A1 | | 5/2012 | |
| EP | 2 918 813 A1 | | 9/2015 | |
| EP | 2918813 | * | 9/2015 | ........... F02M 25/028 |
| EP | 3 018 331 A1 | | 5/2016 | |
| WO | WO 2011/085830 A1 | | 7/2011 | |
| WO | WO 2016/001178 A1 | | 1/2016 | |
| WO | WO 2016/177556 A1 | | 11/2016 | |

OTHER PUBLICATIONS

European Search Report dated Jan. 26, 2017 in European Application 16199388.6 filed on Nov. 17, 2016.
European Office Action dated Nov. 26, 2020 in European Patent Application No. 17798244.4, 3 pages.

* cited by examiner

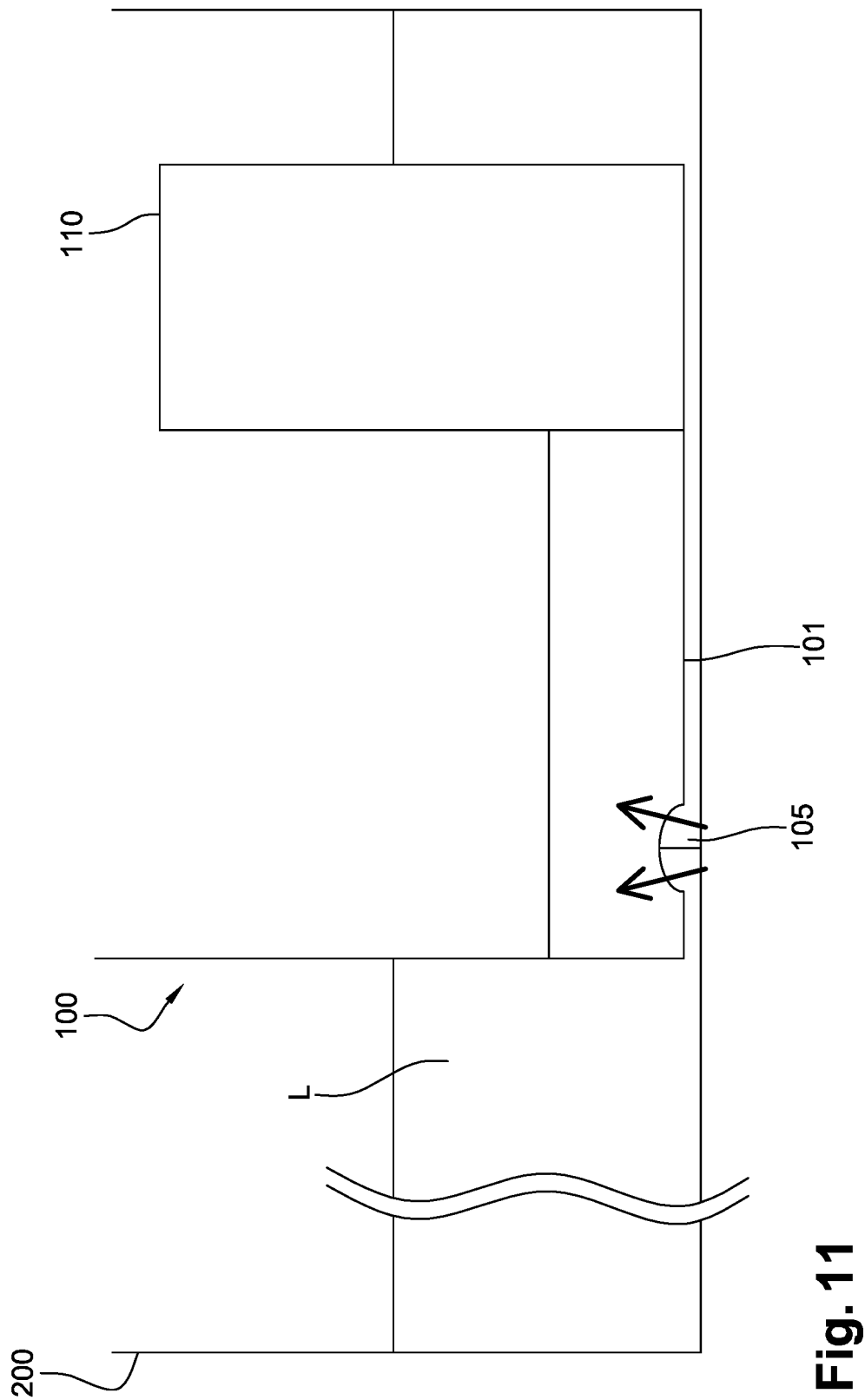

SYSTEM FOR STORING AN AQUEOUS SOLUTION ON-BOARD A VEHICLE

CROSS-REFERENCE TO RELATED APPLICATIONS

This application is a United States national stage application of International Application No. PCT/EP2017/076941, filed Nov. 17, 2017, which designates the United States, and claims priority to European Patent Application No. 16199388.6, filed Nov. 17, 2016, and the entire contents of each of the above applications are hereby incorporated herein by reference in entirety.

FIELD OF INVENTION

The invention relates to a system for storing an aqueous solution, preferably demineralised water, on-board a vehicle, and more in particular to a system for injecting an aqueous solution into an air intake upstream of a combustion chamber or directly in the combustion chamber.

BACKGROUND

It is known to inject water into an air intake upstream of a combustion chamber or directly in the combustion chamber, when the load of the engine of a vehicle is high. By injecting water in the air stream, the air is cooled down, resulting in a higher density and hence more air per volume unit, enhancing the combustion. In that manner more power is obtained, i.e. the performance is boosted. The water for injection needs to be stored on-board the vehicle and needs to be available when the vehicle is in operation.

SUMMARY

It is a first object of exemplary embodiments of the invention to provide a vehicle system for storing an aqueous solution on-board a vehicle, which is more compact and which can ensure that an amount of aqueous solution is available shortly after start-up in various operating conditions, and in particular at low temperatures when the aqueous solution is frozen.

According to a first aspect there is provided a vehicle system for storing an aqueous solution. The vehicle system comprises a first compartment for storing an aqueous solution, a second compartment for storing an aqueous solution, a jet pump, a suction line, and a module. The module comprises a feed pump unit and a heater. The jet pump has a suction inlet, a pressure inlet and an outlet. The feed pump unit is connected for pumping aqueous solution from the first compartment to a feed outlet for feeding aqueous solution out of the first compartment, and is also connected for pumping aqueous solution along a flow path from the first compartment through the feed pump unit, through the pressure inlet of the jet pump to the outlet of the jet pump. The heater is configured and arranged for heating said flow path. The suction inlet is connected to the suction line. The suction line is arranged for receiving aqueous solution from the second compartment. The outlet of said jet pump is arranged for returning aqueous solution from the suction inlet and the pressure inlet to first compartment.

By including the feed pump unit and the heater in the same module in such a way that the flow path through the feed pump unit and the jet pump is heated by the heater, when the aqueous solution is frozen and the heater is activated, it will be possible to activate the feed pump unit shortly after having activated the heater, and the circulation of aqueous solution will further improve the defrosting.

Preferably the jet pump is at least partially arranged in the first compartment. More preferably, the jet pump is integrated in the module. The module may be such that it can be removed as one unit from the vehicle system. By integrating the jet pump with the feed pump unit and the heater, any connecting lines can be shorter and the efficiency of the heating can be improved.

Preferably a non-return valve, typically a check valve, is included in said flow path, downstream of the feed pump unit, in a normal feed mode. The non-return valve avoids that aqueous solution can flow in reverse direction through the path towards an outlet of the feed pump unit. More preferably, the non-return valve is arranged between the outlet of the feed pump unit and the pressure inlet of the jet pump. In that way the non-return valve avoids that aqueous solution in the jet pump can return to an outlet of the feed pump unit.

In an exemplary embodiment the jet pump is arranged in a line extending upwardly in the module, preferably with the pressure inlet lower than the outlet of the jet pump. In that manner the aqueous solution is circulated upwardly. This is especially advantageous when the module is mounted in a bottom wall of the first or second compartment, wherein an inlet of the feed pump unit is preferably located below the minimum liquid level in the first or second compartment, e.g. at less than 10 cm from the plane of the bottom wall of the first or second compartment.

In an exemplary embodiment the first compartment is integrated in the module, and the second compartment is a tank. In another exemplary embodiment the second compartment is a tank, and the first compartment is integrated in the tank.

The first compartment may then take the form of a bowl or swirl pot located in the second compartment, preferably at the bottom of the second compartment. Preferably, the module is then arranged in an opening in a wall of said tank. Preferably the tank is provided with a filler pipe which is arranged such that both the first compartment and the second compartment can be filled with aqueous solution flowing through the filler pipe. The tank may have a bottom wall, a top wall and a sidewall connecting the bottom wall with the top wall. An opening may be arranged in the bottom wall, wherein, in the mounted position of the tank, the bottom wall corresponds with the lowest face of the tank, and wherein the module is mounted in the opening in the bottom wall of the tank, with the first compartment located in the tank.

In another exemplary embodiment the first compartment is a first tank, and the second compartment is a second tank. Preferably an overflow line extends between the first tank and the second tank, wherein one of said first and said second tank may be at a higher location than the other one of said first and said second tank, the higher one being provided with a filler pipe. In another possible embodiment the first tank is provided with a filler pipe and a filler line extends between the filler pipe and the second tank. In a preferred embodiment thereof the first tank has a bottom wall, a top wall and a sidewall connecting the bottom wall with the top wall, wherein an opening is arranged in the bottom wall, wherein, in the mounted position of the first tank, the bottom wall corresponds with the lowest face of the first tank, and wherein the module is mounted in the opening in the bottom wall of the first tank.

In an exemplary embodiment the feed outlet is arranged in the module such that a connection to the feed outlet can be made from outside of the first compartment. In other words, such a feed outlet will allow for a convenient connection with a feed line for feeding the aqueous solution out of the first compartment through the feed outlet to the feed line.

In an exemplary embodiment the vehicle system further comprises an air intake line, an injector and a feed line. The air intake line is located upstream of a combustion chamber of an internal combustion engine. The injector is configured for injecting aqueous solution in the air intake line or in the combustion chamber. The feed line is for feeding the injector with aqueous solution out of the first compartment. The feed pump unit is further configured to pump aqueous solution to the feed line.

In an exemplary embodiment the vehicle system further comprises a controller configured for controlling the feed pump unit to pump aqueous solution from the second compartment to the first compartment and to pump aqueous solution to the feed line. In other words, the feed pump unit may be operated to pump aqueous solution along the path including the jet pump in order to draw aqueous solution out of the second compartment, whilst at the same time feeding aqueous solution through the feed line as required for injection. When the pump is on, the aqueous solution is continuously circulated through the path including the jet pump. The controller may be further configured to control the feed pump unit based on the level of aqueous solution in the first compartment. For example, the controller may switch on the pump when the level is below a minimum threshold level or when the aqueous solution needs to be injected by the injector.

In an exemplary embodiment the vehicle system further comprises a quality sensor arranged downstream of the jet pump to sense the quality of the aqueous solution leaving the outlet of the jet pump.

In an exemplary embodiment the module further comprises any one or more of the following components: a level sensor, a filter, a bio-decontamination device. The level sensor may be arranged in a lower part of the module and may be of any known type. The filter may be arranged upstream of the feed pump unit, in a normal feed mode, such that the aqueous solution from the first compartment first passes through the filter before it enters the feed pump unit. The bio-decontamination device may be arranged e.g. in the previously mentioned flow path including the feed pump unit and the jet pump, either downstream or upstream of the jet pump.

The aqueous solution is preferably a solution containing at least 90% water, more preferably at least 95% water, and most preferably at least 98% water. The aqueous solution is e.g. demineralized water. In other embodiments an amount of methanol may be added to the aqueous solution to lower the freezing point.

The feed pump unit may be a gear pump with a motor. The jet pump is a pump which does not comprise a motor and which comprises a venturi device between the pressure inlet and the outlet of the jet pump.

In an exemplary embodiment the heater comprises an electrical heater. Using an electrical heater has the advantage that immediate heater power is available, reducing the start-up time at cold temperatures. Optionally the heater may further comprise a tubing for circulating engine coolant. The heater power of tubing will depend on the engine heat up speed, and without the electrical heater the start-up time would be much longer.

The electrical heater may be arranged on or in the module, e.g. substantially surrounding the jet pump and the feed pump unit, adjacent or in a wall of the first compartment. Preferably the electrical heater is a flexible electrical heater. This allows the electrical heater to be brought through a rather small opening in the tank, whilst occupying a surface larger than the surface of said opening. A flexible heater may comprise e.g. portions extending under the feed pump unit and/or adjacent to the feed pump unit and/or extending through a side wall of the first compartment and/or in a side wall or bottom wall of the first compartment and/or fixed to a side wall or bottom wall of the first compartment.

The vehicle system may further comprise a controller for controlling the electrical heater e.g. in function of the engine temperature or in function of the time during which the engine has been running. In that manner the heating can be adequately controlled and optimized.

According to an exemplary embodiment, the vehicle system further comprises a suction line heating system configured for heating at least a portion of the suction line. In that manner it can be guaranteed that frozen aqueous solution can be heated and sucked out of the second compartment, also when the suction line is quite long.

The suction line heating system may comprise a second heater arranged around a section of the suction line, preferably at least a section of the suction line between an inner space of the first compartment and a bottom wall of the second compartment. The first and/or the second heater may be an electrical heater, preferably a flexible electrical heater. The first heater may be connected to the second heater.

Alternatively or in addition, the suction line heating system may comprise a tubing for circulating engine coolant, wherein preferably the tubing is arranged at a distance which is smaller than 5 cm from a section of the suction line.

Preferably the suction line has a length which is larger than 200 mm, more preferably larger than 300 mm, even more preferably larger than 400 mm. In that manner the suction line can reach different locations in the second compartment.

Preferably, a distance between a section of the suction line and a bottom wall of the second compartment is smaller than 5 cm, preferably smaller than 3 cm; wherein preferably a length of said section of the suction line is larger than 200 mm. In that manner aqueous solution in a lower portion of the second compartment can be sucked out of the second compartment.

According to an exemplary embodiment, the first compartment has a substantially cylindrical shape with a diameter between 100 mm and 200 mm, and a maximum height between 50 and 100 mm; and/or wherein a volume of the second compartment is between 5 and 15 liter, preferably between 8 and 13 liter. These dimensions will allow a sufficient amount of aqueous solution in the first compartment, also when a vehicle is driving on a hill.

The invention is especially advantageous for gasoline cars but may also be useful for diesel cars.

According to a second aspect of the invention, there is provided a vehicle system storing an aqueous solution. The vehicle system comprises a first tank for storing an aqueous solution; a second tank for storing an aqueous solution; a feed pump unit; and a jet pump having a suction inlet, a pressure inlet and an outlet. The feed pump unit is connected for pumping aqueous solution from the first tank to the pressure inlet of the jet pump and to a feed outlet for feeding aqueous solution out of the first tank. The suction inlet is arranged for receiving aqueous solution from the second tank. The outlet of the jet pump is arranged for returning aqueous solution from the suction inlet and from the pressure inlet to first tank. In that manner there is provided a system allowing to have two tanks at different locations in the vehicle, whilst needing only one feed pump. Indeed, the feed pump unit can be used for pumping simultaneously aqueous solution from the first tank to a feed line and from the second tank to the first tank via the jet pump.

In a preferred embodiment of the second embodiment an overflow line is provided between the first and the second tank, such that when the level of the aqueous solution in the first tank is above a certain level, aqueous solution flows from the first tank to the second tank through the overflow line.

Advantageous embodiments of the second aspect are defined in any one of the following clauses 1. A vehicle system storing an aqueous solution; said vehicle system comprising:
   a first tank (100) for storing an aqueous solution (L);
   a second tank (200) for storing an aqueous solution (L);
   a feed pump unit (110);
   a jet pump (300) having a suction inlet (310), a pressure inlet (320) and an outlet (330);
   said feed pump unit being connected for pumping aqueous solution from the first tank to the pressure inlet of the jet pump and to a feed outlet for feeding aqueous solution out of the first tank;
   said suction inlet being arranged for receiving aqueous solution from the second tank; said outlet being arranged for returning aqueous solution from the suction inlet and from the pressure inlet to first tank.
2. The vehicle system of clause 1, wherein the jet pump (300) is arranged in the first tank.
3. The vehicle system of clause 1, wherein the jet pump (300) is arranged in the second tank.
4. The vehicle system of any preceding clause, wherein the feed pump unit is arranged in the first tank.
5. The vehicle system of clause 1 or 2, wherein the jet pump and the feed pump unit are arranged in a module (400) arranged in an opening in a wall of the first tank.
6. The vehicle system of clause 1 or 3, wherein the jet pump is arranged in a module (500) arranged in an opening in a wall of the second tank.
7. The vehicle system of any preceding clause, wherein an overflow line (210) extends between the first tank and the second tank.
8. The vehicle system of any preceding clause, wherein the jet pump is arranged in an upwardly extending line in the first tank, and wherein a suction line (290) is arranged between the second tank and the suction inlet of the jet pump.
9. The vehicle system of any preceding clause, further comprising:
   an air intake line (710) upstream of a combustion chamber (700) of an internal combustion engine;
   an injector (600) configured for injecting aqueous solution in the air intake line or in the combustion chamber;
   a feed line (180) connected between the feed outlet and the injector for feeding said injector with aqueous solution out of the first tank (100).
10. The vehicle system of the preceding clause, further comprising a return line (190) connecting the feed line with the interior of the tank.
11. The vehicle system of the preceding clause, wherein the jet pump is arranged in the return line, and wherein a suction line (290) is arranged between the second tank and the suction inlet of the jet pump.
12. The vehicle system of any preceding clause, further comprising a controller (500) configured for controlling the main pump to pump aqueous solution from the second tank to the first tank when the level in the first tank is below a predetermined threshold.
13. The vehicle system of any preceding clause, further comprising a quality sensor arranged downstream of the jet pump to sense the quality of the aqueous solution leaving the outlet of the jet pump.
14. The vehicle system of any one of the preceding clauses, wherein the first tank is arranged at a higher level than the second tank.
15. The vehicle system of any one of the preceding clauses, wherein the first tank is provided with a filler pipe (190) for filling the first tank with aqueous solution.
16. The vehicle system of clause 14, wherein a filler line (220) extends between the filler pipe and the second tank.
17. The vehicle system of the preceding clause, wherein the first tank has a bottom wall (101), a top wall (102) and a sidewall (103) connecting the bottom wall (101) with the top wall (102), wherein an opening is arranged in the bottom wall (101), wherein, in the mounted position of the first tank (100), the bottom wall corresponds with the lowest face of the tank, and wherein a module (400) carrying the feed pump unit is mounted in the opening in the bottom wall of the first tank.
18. The vehicle system of the preceding clause, wherein the module (400) further comprises any one or more of the following components: a heater, a level sensor, a quality sensor, a filter, a bio-decontamination device, the jet pump.
19. The vehicle system of any one of the preceding clauses, wherein the aqueous solution contains at least 90% water.
20. The vehicle system of any one of the preceding clauses, wherein the feed pump unit is a gear pump.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 11 illustrates schematically a bottom of a module for use in an exemplary embodiment.

DESCRIPTION OF EMBODIMENTS

Figure 1:
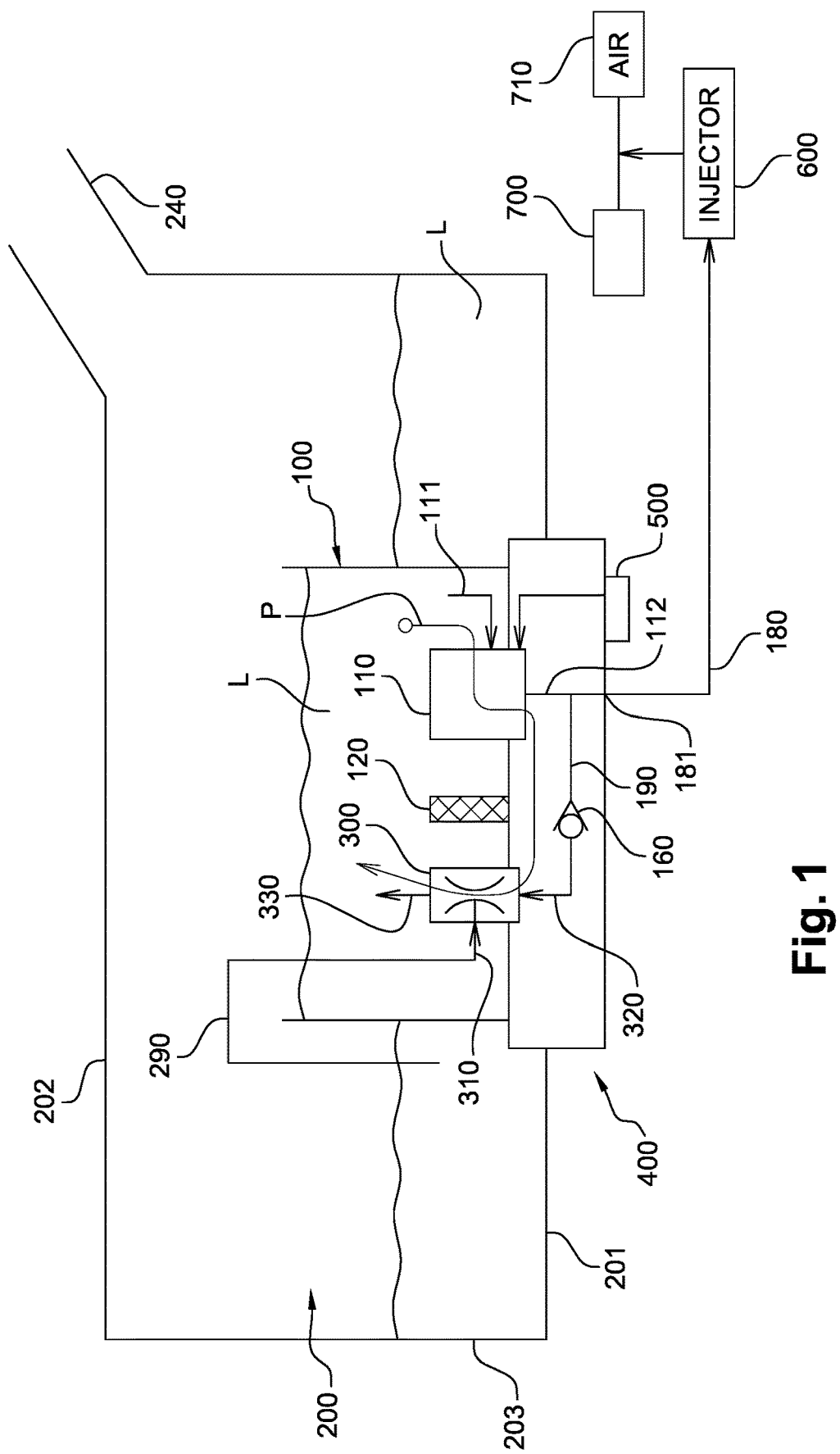
FIG. 1 illustrates schematically a cross section of an exemplary embodiment of a vehicle system with a first compartment positioned inside a second compartment.

FIG. 1 illustrates a vehicle system storing an aqueous solution L. The vehicle system comprises a first compartment 100 for storing aqueous solution L, a second compartment 200 for storing an aqueous solution L, and a module 400. In this embodiment second compartment 200 is a tank, and first compartment 100 is a bowl integrated in module 400, such that the bowl is positioned in the second compartment 200. Module 400 is arranged in an opening in a wall of tank 200. Tank 200 is provided with a filler pipe 240 for filling tank 200, and hence also compartment 100, with aqueous solution L. Tank 200 has a bottom wall 201, a top wall 202 and a sidewall 203 connecting the bottom wall 201 with the top wall 202. An opening is arranged in bottom wall 201. In the mounted position of tank 200, bottom wall 201 corresponds with the lowest face of tank 200. Module 400 is mounted in the opening in bottom wall 201 of tank 200, e.g. by welding or by any other suitable connection means, e.g. using a ring-nut system screwed onto a thread on tank 200, or using a closure system of the bayonet type. In another non-illustrated embodiment the opening may be arranged in sidewall 203, in a lower half of the tank 200.

Module 400 comprises a feed pump unit 110, a jet pump 300, and a heater 120. Feed pump unit 110 is connected for pumping aqueous solution L from the first compartment 100 to a feed outlet 181. Feed outlet 181 is intended for being connected to a feed line 180 for injecting aqueous solution L by an injector 600, e.g. in an air intake line 710 upstream of a combustion chamber 700 of an internal combustion engine. Alternatively aqueous solution may be injected directly in combustion chamber 700 of the internal combustion engine. More generally, for the described application, the aqueous solution may be injected anywhere as long as the injection is such that the air injected in combustion chamber 700 is cooled. Feed line 180 extends between feed outlet 181 and injector 600, for feeding injector 600 with aqueous solution out of first compartment 100.

Jet pump 300 has a suction inlet 310, a pressure inlet 320 and an outlet 330. Feed pump unit 110 is further connected for pumping aqueous solution along a flow path P. The flow path P extends from an inlet 111 of feed pump unit 110 to an outlet 112 of feed pump unit 110 through a line 190 between outlet 112 and pressure inlet 320 of jet pump 300, to outlet 330 of jet pump 300. Suction inlet 310 is connected to a suction line 290 arranged for receiving aqueous solution from the second compartment 200. Outlet 330 of jet pump 300 is arranged for returning aqueous solution from suction inlet 310 and from pressure inlet 320 to first compartment 100. The vehicle system further comprises a controller 500 configured for controlling feed pump unit 110. Controller 500 may be configured to pump aqueous solution from second compartment 200 to first compartment 100 when the level of the aqueous solution in first compartment 100 is below a predetermined level. Controller 500 is shown mounted on module 400, but the skilled person understands that it may also be located remotely from module 400.

Heater 120 is configured and arranged for heating at least said flow path P. Heater 120 may be arranged e.g. between feed pump unit 110 and jet pump 300, and/or around feed pump unit 110 and jet pump 300. Preferably heater 120 is arranged either partially or fully inside first compartment 100 or in a wall delimiting first compartment 100.

A non-return valve 160, typically a check valve, may be included in the flow path P, downstream of the feed pump unit 110, preferably in a line section between the outlet 112 of the feed pump unit 110 and the pressure inlet 320 of the jet pump 300.

Outlet 112 of feed pump unit 110 is preferably located at the bottom of feed pump unit 110. Further, preferably jet pump 300 is arranged in a line section extending upwardly in module 400, such that the aqueous solution is recirculated upwardly and returned in first compartment 100 at a position which is higher than pump outlet 112, and preferably also higher than pump inlet 111.

Now a more detailed exemplary embodiment of module 400 will be described with reference to FIG. 2. The module 400 is adapted for mounting in an opening of a bottom wall of a tank. The module 400 has an integrated first compartment 100 for receiving aqueous solution L, with the shape of a bowl, e.g. a partially cylindrical bowl. The sidewall of the bowl 100 may be provided with one or more recesses at a distance of the bottom of the bowl, but the recesses should not be positioned too low, such that there is always a minimum amount of aqueous solution in the bowl 100 provided that the tank is not empty. Module 400 comprises a feed pump unit 110 with a motor 117 (e.g. a BLDC motor) and a gear pump 115; a jet pump 300; and a heater 121, 122, 123. Jet pump 300 has a suction inlet 310, a pressure inlet 320 and an outlet 330. Feed pump unit 110 is further connected for pumping aqueous solution along a flow path. The flow path extends from an inlet 111 of the feed pump unit 110 to an outlet 112 of feed pump unit 110 through a line 190 between outlet 112 and pressure inlet 320 of jet pump 300, to outlet 330 of jet pump 300. Suction inlet 310 is connected to a suction line 290 arranged for receiving aqueous solution from second compartment 200. Outlet 330 of jet pump 300 is arranged for returning aqueous solution from suction inlet 310 and from pressure inlet 320 to first compartment 100.

Feed pump unit 110 has an inlet 111 at the bottom side of feed pump unit 110 and an outlet 112 also at the bottom side of feed pump unit 110, below gear pump 115. Outlet 112 is connected to a feed outlet 181, and to a return line section 190 extending sideward, partly underneath the pump unit 110, towards check valve 160. Check valve 160 and jet pump 300 are arranged in a line section extending upwardly in module 400, such that the aqueous solution is recirculated upwardly and returned in first compartment 100 at a position which is higher than pump outlet 112, and preferably also higher than pump inlet 111. Line section 190 is integrated in module 400 and is located partially below feed pump unit 110. Jet pump 300 is located adjacent to feed pump unit 110, and returns the aqueous solution into first compartment 100.

The heater comprises a heated portion 121 which is provided adjacent the inner wall of first compartment 100. The heater is preferably an electrical heater. In the illustrated embodiment the heater comprises a flexible heater portion 121, optionally with flexible tentacles 123 extending in and/or around various areas of the first compartment 100. The bowl 100 may be provided with recesses through which the tentacles 123 extend. However, it is also possible to provide non-flexible electrical heating elements (not shown), e.g. PTC heating elements, attached to or integrated in module 400, e.g. attached to the inside and/or the outside of the first compartment, or in wall elements of first compartment 100. A further heater portion 122 may be provided at the bottom of the first compartment, below feed pump unit 110, and optionally also below a filter 150, see further.

Filter 150 is integrated in module 400, upstream of feed pump unit 110, in the normal feed mode, i.e. when aqueous solution is pumped by feed pump unit 110 out of feed outlet 181. In the illustrated embodiment the module 400 contains an upper sealed compartment 410 for motor 117 and a lower compartment 420 for gear pump 115 and filter 150. Aqueous solution enters the lower compartment 420 at the bottom thereof, see inlet 421, passes through filter 150 and leaves the lower compartment at outlet 112.

First compartment 100 may have an outer wall with a shape which is such that an inner volume is created for receiving feed pump unit 110 and jet pump 300, and a small outer volume for receiving a level sensor. The outer wall of first compartment 100 may be shaped to surround partially a level sensor arranged outside of the first compartment. In that manner damage to the level sensor is avoided.

Although not illustrated, module 400 may further comprise a quality sensor, e.g. arranged in line 190 or in the upwardly extending line containing jet pump 300, to sense the quality of the aqueous solution. Preferably the quality sensor is arranged downstream of jet pump 300 to sense the quality of the aqueous solution leaving outlet 330, i.e. the quality of the mixture of aqueous solution from the second compartment 200 and the first compartment 100. Also module 400 preferably comprises a level sensor and/or a bio-decontamination device, e.g. a UV bio-decontamination device. Preferably the bio-decontamination device is arranged downstream of jet pump 300 to bio-decontaminate the aqueous solution leaving outlet 330, i.e. the mixture of aqueous solution from the second compartment 200 and the first compartment 100.

Figure 3:
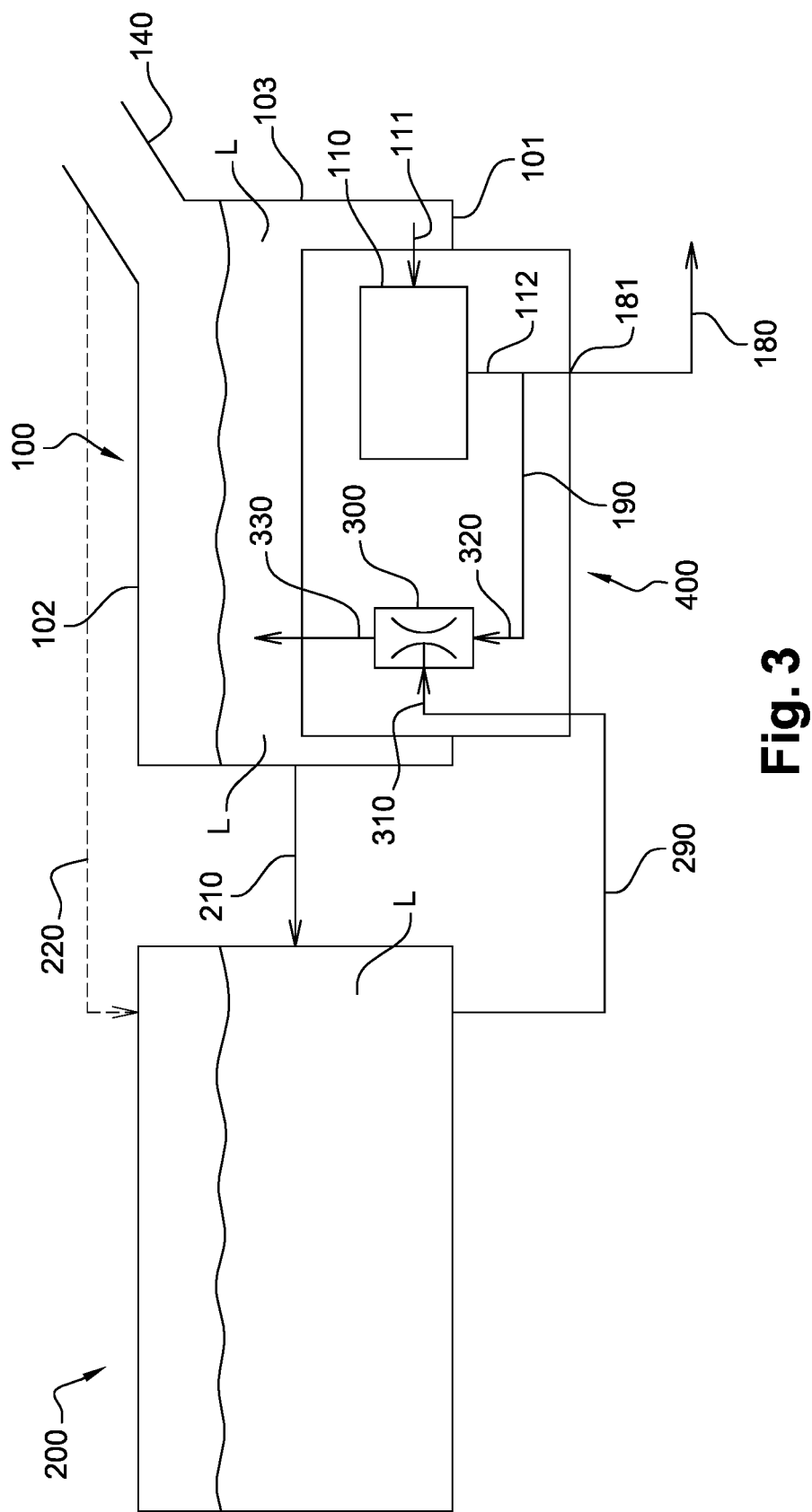
FIG. 3 illustrates schematically a cross section of an exemplary embodiment of a vehicle system with a first tank as the first compartment and a second tank as a second compartment.

FIG. 3 illustrates another vehicle system storing an aqueous solution L. The vehicle system comprises a first tank 100 for storing aqueous solution L, a second tank 200 for storing an aqueous solution L, and a module 400. The module 400 is arranged in an opening in a wall of first tank 100. First tank 100 is provided with a filler pipe 140 for filling first tank 100, and via an overflow line 210, also second tank 200, with aqueous solution L. First tank 100 has a bottom wall 101, a top wall 102 and a sidewall 103 connecting bottom wall 101 with top wall 102. An opening is arranged in bottom wall 101. In the mounted position of first tank 100, bottom wall 101 corresponds with the lowest face of first tank 100. Module 400 is mounted in the opening in bottom wall 101 of first tank 100, e.g. by welding or by any other suitable connection means. In another non-illustrated embodiment the opening may be arranged in sidewall 103, in a lower half of the tank 100.

Module 400 comprises a feed pump unit 110, a jet pump 300, and optionally also a heater 120 (not shown in FIG. 3). Feed pump unit 110 is connected for pumping aqueous solution L from the first compartment 100 to a feed outlet 181 intended for being connected to a feed line 180 as in the embodiment of FIG. 1. Jet pump 300 has a suction inlet 310, a pressure inlet 320 and an outlet 330. Feed pump unit 110 is further connected for pumping aqueous solution along a flow path. The flow path extends from an inlet 111 of feed pump unit 110 to an outlet 112 of feed pump unit 110 through a line 190 between outlet 112 and pressure inlet 320 of jet pump 300, to outlet 330 of jet pump 300. Suction inlet 310 is connected to a suction line 290 arranged for receiving aqueous solution from second tank 200. Outlet 330 of jet pump 300 is arranged for returning aqueous solution from suction inlet 310 and from pressure inlet 320 to first tank 100. The vehicle system may further comprise a controller (not shown) configured for controlling feed pump unit 110. The controller may be configured to pump aqueous solution from second tank 200 to first tank 100 when the level of the aqueous solution in first tank 100 is below a predetermined level.

An optional heater (not shown) may be configured and arranged for heating at least said flow path. The heater may be arranged and configured as described above in connection with FIGS. 1 and 2. Further a check valve (not shown) may be included in the flow path in a similar manner as described above for FIGS. 1 and 2.

First tank 100 may be positioned in a vehicle at a higher level than second tank 200. In an alternative embodiment first tank 100 and second tank 200 may be positioned at more or less the same height and a filler line 220 may be provided between filler pipe 140 of first tank 100 and second tank 200.

Figure 4:
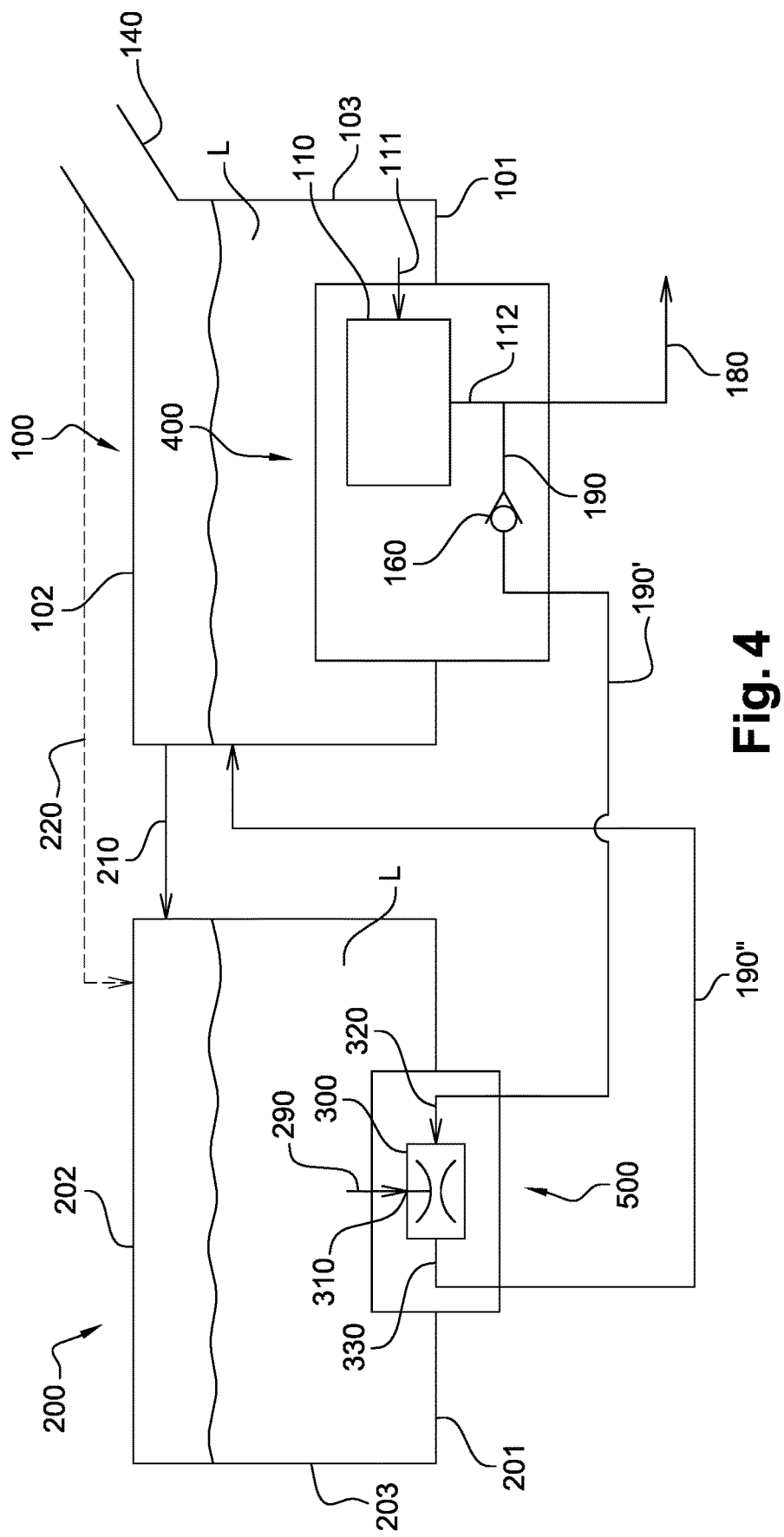
FIG. 4 illustrates schematically a cross section of another exemplary embodiment of a vehicle system with a first tank as the first compartment and a second tank as a second compartment.

FIG. 4 illustrates an embodiment which is similar to the embodiment of FIG. 3 with this difference that jet pump 300 is not arranged in module 400 but is arranged in a separate module 500 mounted in an opening in bottom wall 201 of second tank 200. Line sections 190 and 190' extend between outlet 112 of feed pump unit 110 and pressure inlet 320. Line section 190 is integrated in module 400, and line section 190' is located outside first tank 100. A further line section 190" connects outlet 330 of jet pump 300 with first tank 100 to return aqueous solution from the jet pump 300 to first tank 100. A check valve 160 is arranged in line section 190. As in the embodiment of FIGS. 1-3 module 400 may comprise additional components such as a heater, a level sensor, a quality sensor, a bio-decontamination device, a filter, etc.

Figure 5:
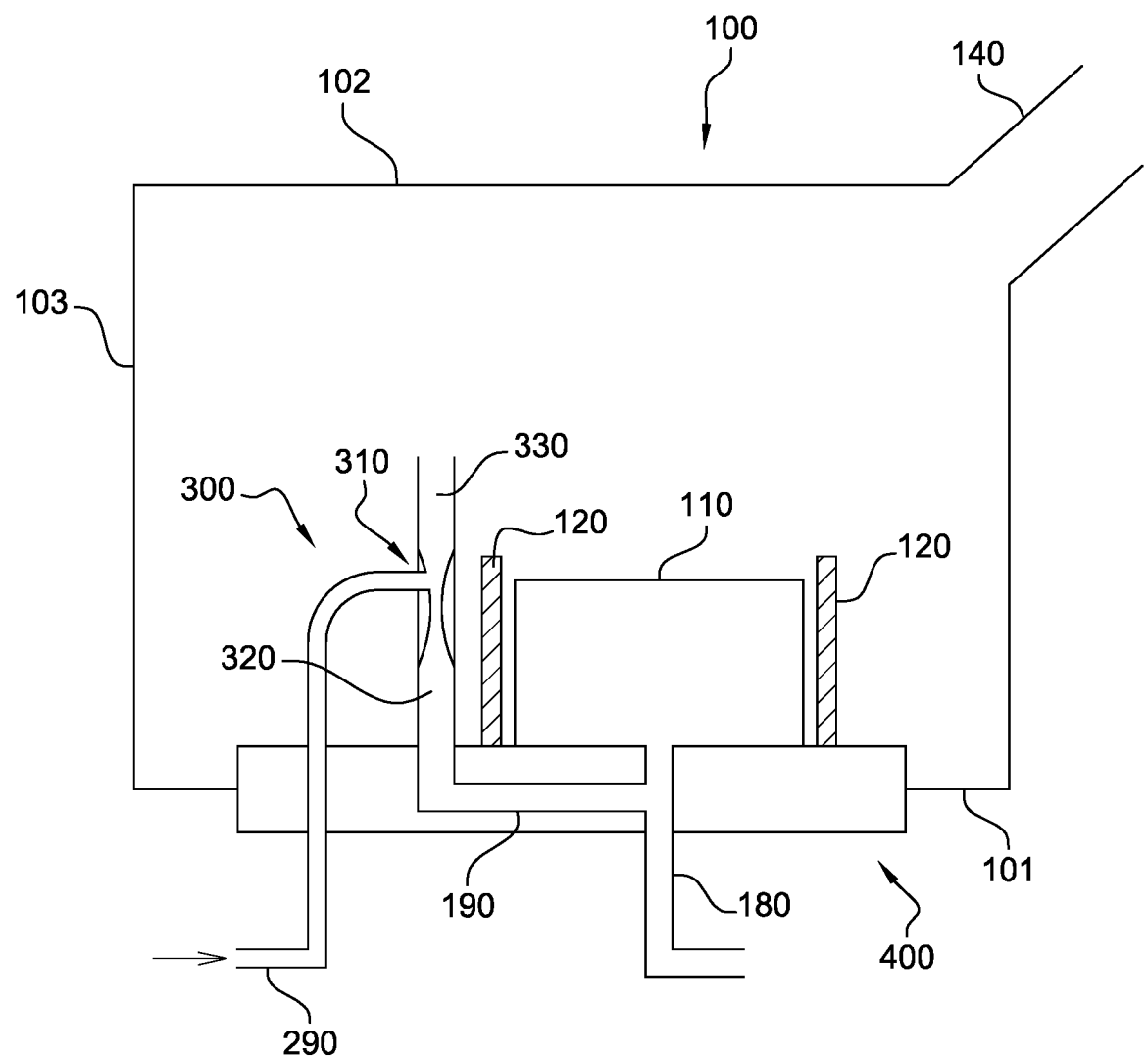
FIG. 5 illustrates schematically a cross section of an exemplary embodiment of a first tank for use in a vehicle system.

FIG. 5 illustrates in more detail an exemplary embodiment of a module 400 for use in the vehicle system of FIG. 3. As illustrated a heater 120 may be arranged around feed pump unit 110 and adjacent jet pump 300. In this embodiment suction line 290 goes through the bottom of module 400 out of first tank 100. Optionally a check valve may be included in line section 190.

Figure 6:
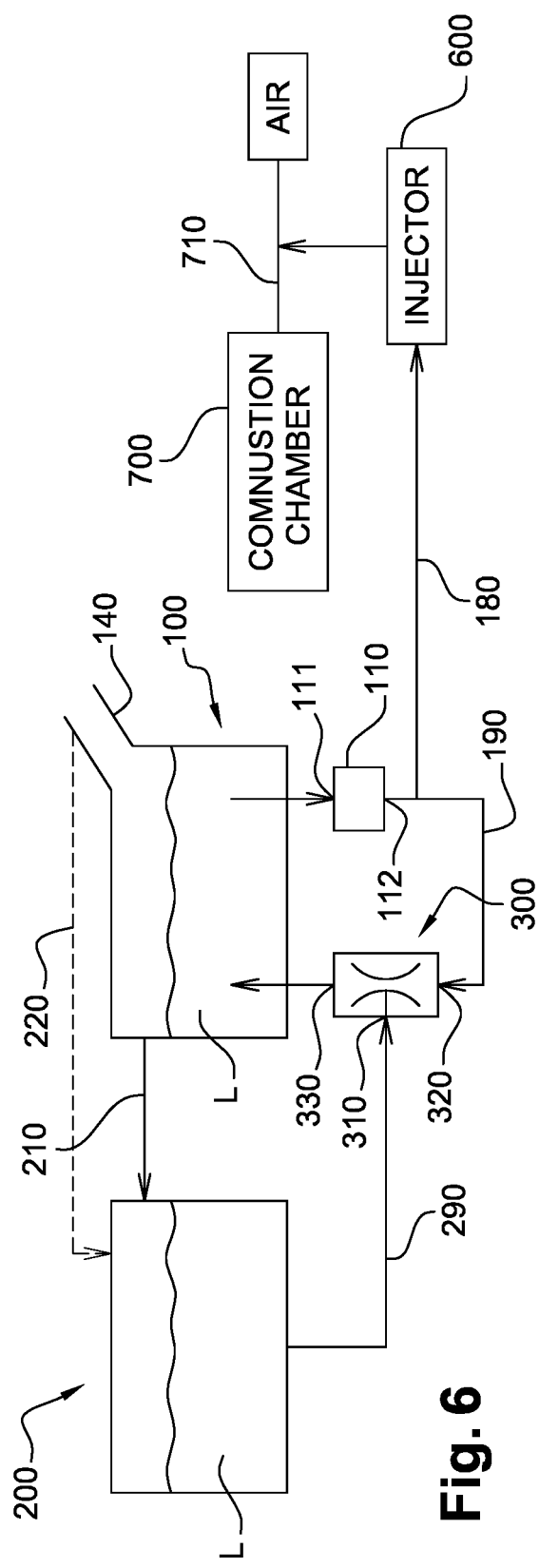
FIGS. 6 and 7 illustrate schematically further exemplary embodiments of vehicle systems.

FIG. 6 illustrates another exemplary embodiment according to the second aspect of the invention. The vehicle system comprises a first tank 100 for storing aqueous solution L, a second tank 200 for storing an aqueous solution L, and a module 400. The module 400 is arranged in an opening in a wall of first tank 100. First tank 100 is provided with a filler pipe 140 for filling first tank 100, and via an overflow line 210, also second tank 200, with aqueous solution L. The vehicle system comprises a feed pump unit 110, a jet pump 300, and optionally also a heater (not shown in FIG. 6). Feed pump unit 110 is connected for pumping aqueous solution L from first tank 100 to a feed line 180 as in the embodiment of FIG. 1. Jet pump 300 has a suction inlet 310, a pressure inlet 320 and an outlet 330. Feed pump unit 110 is further connected for pumping aqueous solution along a flow path. The flow path extends from first tank 100 to an inlet 111 of feed pump unit 110 to an outlet 112 of feed pump unit 110 through a line 190 between outlet 112 and pressure inlet 320 of jet pump 300, to outlet 330 of jet pump 300. Suction inlet 310 is connected to a suction line 290 arranged for receiving aqueous solution from second tank 200. Outlet 330 of jet pump 300 is arranged for returning aqueous solution from suction inlet 310 and from pressure inlet 320 to first tank 100. The vehicle system may further comprise a controller (not shown) configured for controlling feed pump unit 110. The controller may be configured to pump aqueous solution from second tank 200 to first tank 100 when the level of the aqueous solution in first tank 100 is below a predetermined level. An optional heater (not shown) may be configured and arranged for heating at least said flow path. The heater may be arranged e.g. in first tank 100, near inlet 111, and/or around the lines of the flow path and/or around the feed pump unit and/or around jet pump 300. Further a check valve (not shown) may be included in the flow path in a similar manner as described above for FIGS. 1-5. First tank 100 may be positioned in a vehicle at a higher level than second tank 200. In an alternative embodiment first tank 100 and second tank 200 may be positioned at more or less the same height and a filler line 220 may be provided between filler pipe 140 of first tank 100 and second tank 200.

Figure 7:
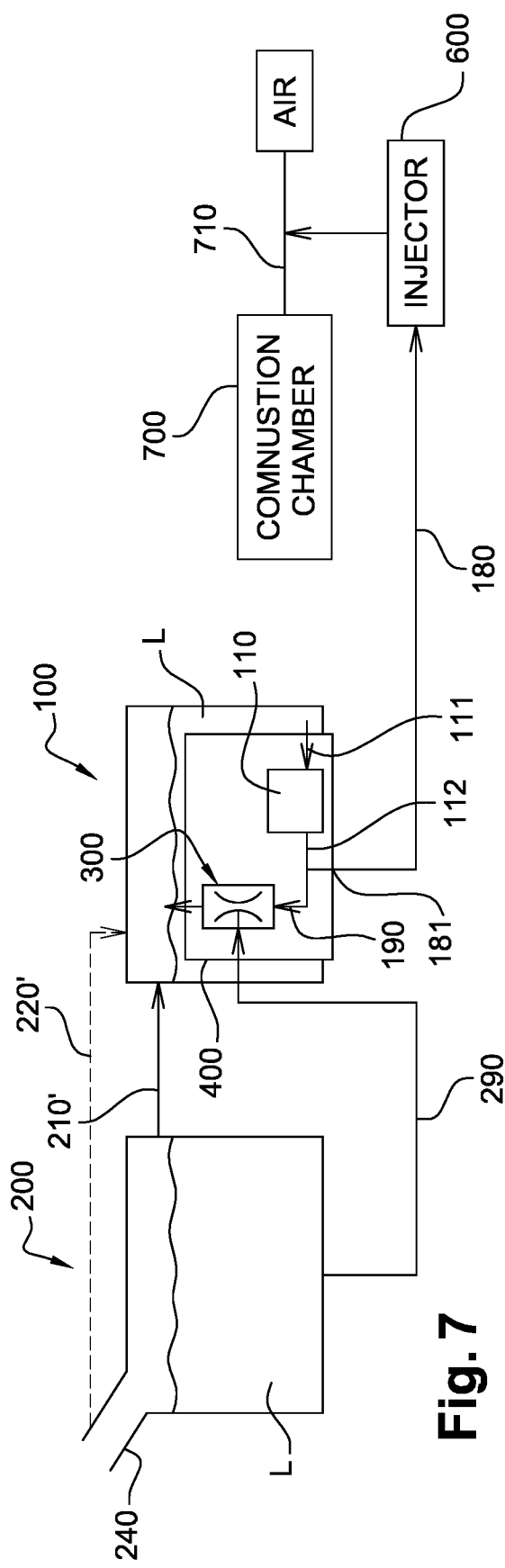

FIG. 7 illustrates another vehicle system storing an aqueous solution L. The vehicle system comprises a first tank 100 for storing aqueous solution L, a second tank 200 for storing an aqueous solution L, and a module 400. The module 400 is arranged in first tank 100. Second tank 200 is provided with a filler pipe 240 for filling second tank 200, and via an overflow line 210', also first tank 100, with aqueous solution L. Module 400 comprises a feed pump unit 110, a jet pump 300, and optionally also a heater (not shown in FIG. 7). Feed pump unit 110 is connected for pumping aqueous solution L from first tank 100 to a feed outlet 181 intended for being connected to a feed line 180 as in the embodiment of FIG. 1. Jet pump 300 has a suction inlet 310, a pressure inlet 320 and an outlet 330. Feed pump unit 110 is further connected for pumping aqueous solution along a flow path. The flow path extends from an inlet 111 of feed pump unit 110 to an outlet 112 of feed pump unit 110 through a line 190 between outlet 112 and pressure inlet 320 of jet pump 300, to outlet 330 of jet pump 300. Suction inlet 310 is connected to a suction line 290 arranged for receiving aqueous solution from second tank 200. Outlet 330 of jet pump 300 is arranged for returning aqueous solution from suction inlet 310 and from pressure inlet 320 to first tank 100. The vehicle system may further comprise a controller (not shown) configured for controlling feed pump unit 110. The controller may be configured to pump aqueous solution from second tank 200 to first tank 100 when the level of the aqueous solution in first tank 100 is below a predetermined level. An optional heater (not shown) may be configured and arranged for heating at least said flow path. The heater may be arranged and configured as described above in connection with FIGS. 1 and 2. Further a check valve (not shown) may be included in the flow path in a similar manner as described above for FIGS. 1 and 2. First tank 100 may be positioned in a vehicle at a slightly lower level than second tank 200. In an alternative embodiment first tank 100 and second tank 200 may be positioned at more or less the same height and a filler line 220' may be provided between filler pipe 240 of second tank 200 and first tank 100.

The aqueous solution is preferably a solution containing at least 90% water, more preferably at least 95% water, and most preferably at least 98% water. The aqueous solution is e.g. demineralized water. In other embodiments an amount of methanol may be added to the aqueous solution to lower the freezing point.

In exemplary embodiments of the invention, preferably, the feed pump unit 110 is configured to be able generate a flow of between 60 and 100 kg/h through the feed line 180. Further, the controller is preferably configured to control pump unit 110 in function of the load of the engine. When the load reaches a predetermined threshold, the feed pump unit 110 is made to pump with a flow speed within a predetermined range.

Although a gear pump is advantageous for use in exemplary embodiments, also other pumps may be used, e.g. a gerotor pump, a turbine pump, a membrane pump, a piston pump.

In exemplary embodiments of the invention, the heater may be an electrical heater, e.g. a flexible electrical heater comprising a flexible sheet with integrated electrical tracks. The flexible sheet may comprise two flexible films, wherein at least one electrical track is arranged between the two flexible films. The sheet may be a sheet with a central portion, and at least one flap and/or a plurality of flexible tentacles may extend from the central portion in the tank or on/in the module. Using an electrical heater has the advantage that immediate heater power is available reducing the start-up time at cold temperatures. A supply rate of molten aqueous solution by the electrical heater may be between 150 and 350 g/h. The electrical heater may be controlled by a controller in function of the engine temperature, in order to heat more when the engine temperature is too low and less when the engine temperature is increasing.

In exemplary embodiments of the invention a tank 100, 200 may comprise a bottom shell and a top shell. The tank 100, 200 may be made of a plastic material, preferably a polyolefin material, e.g. a material comprising PE or PP.

Figure 8:
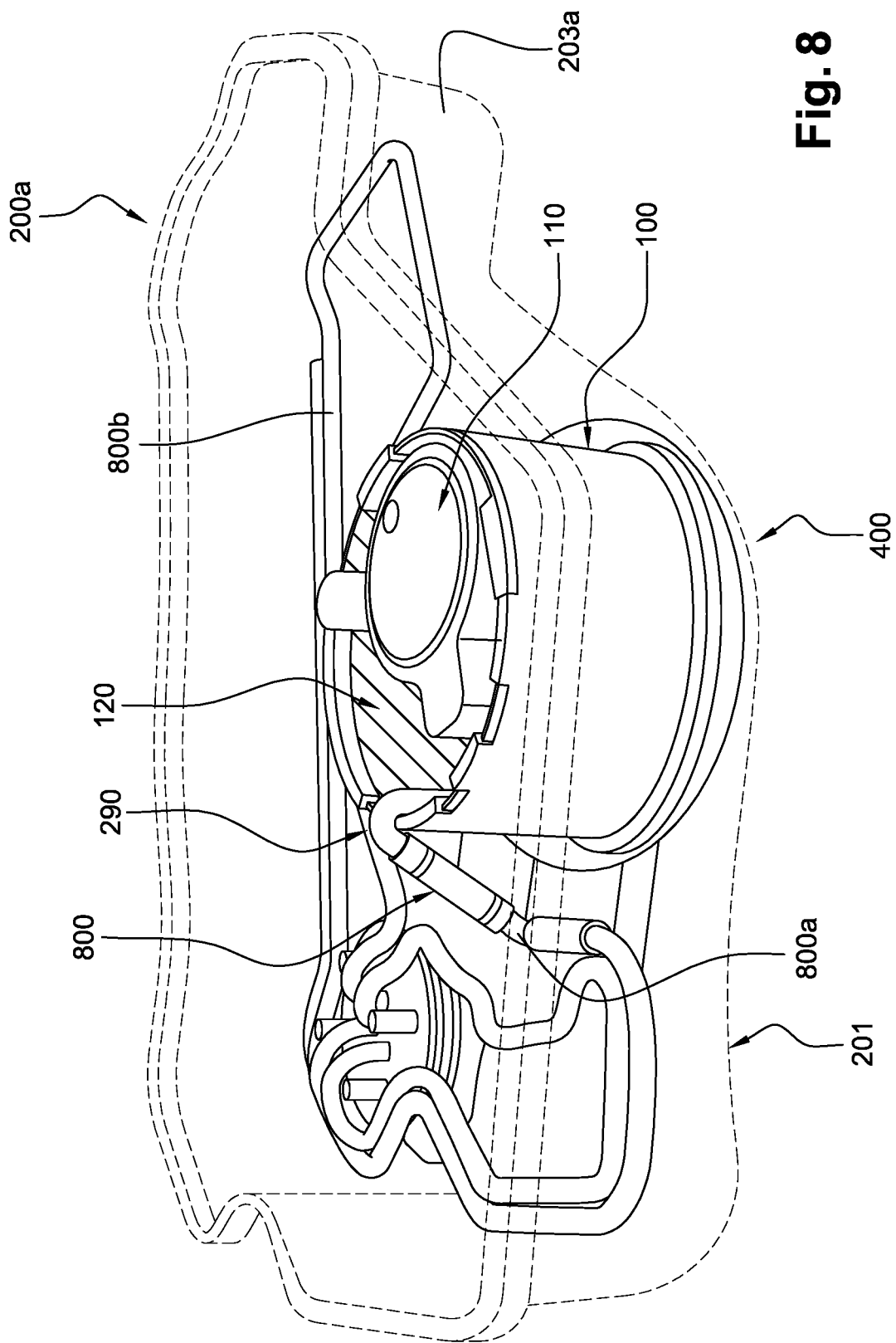
FIGS. 8, 9 and 10 show a perspective view, a partial perspective view with a cross section through the jet pump, and a detailed top view of an exemplary embodiment of a vehicle system, respectively.
Figure 9:
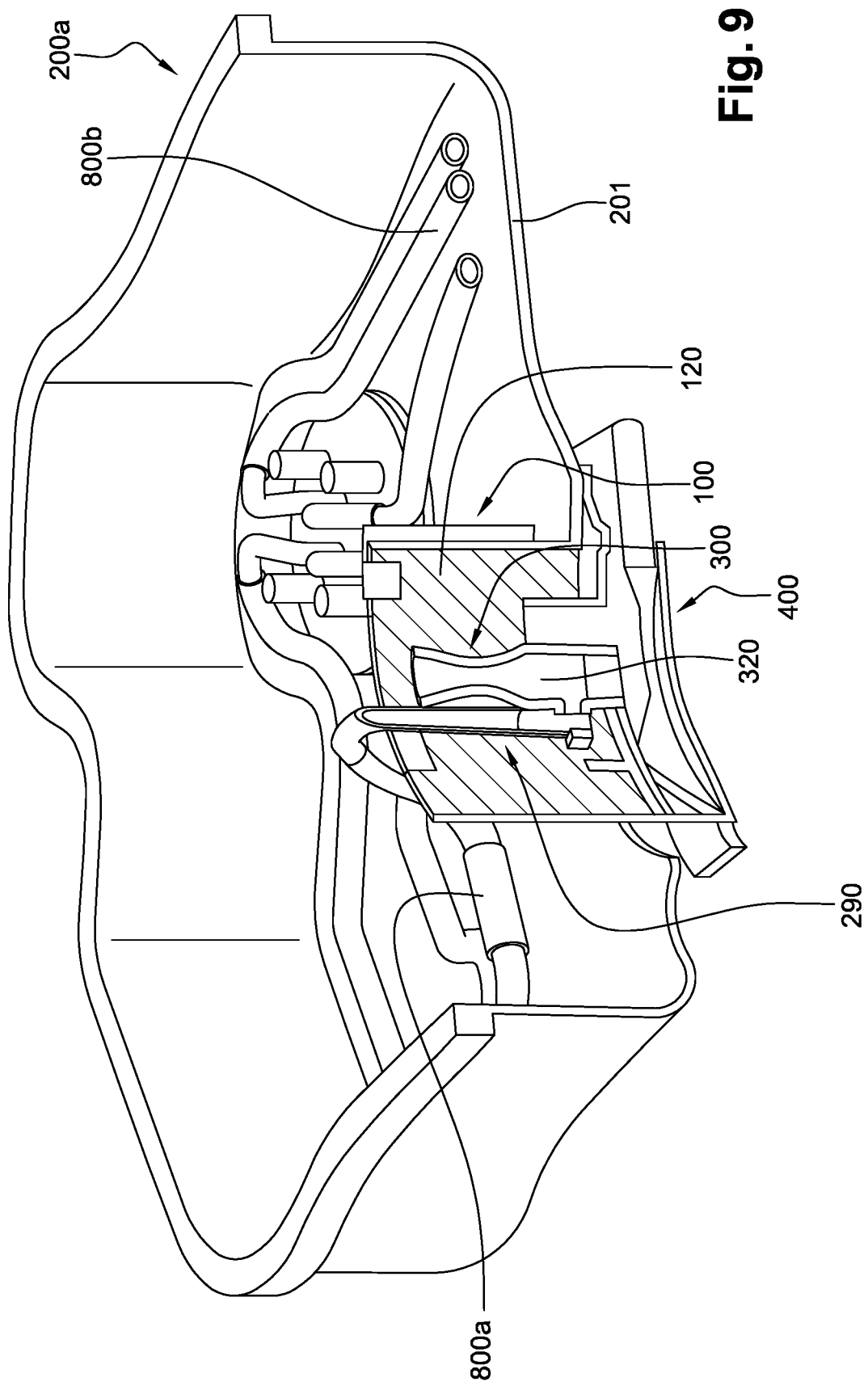
Figure 10:
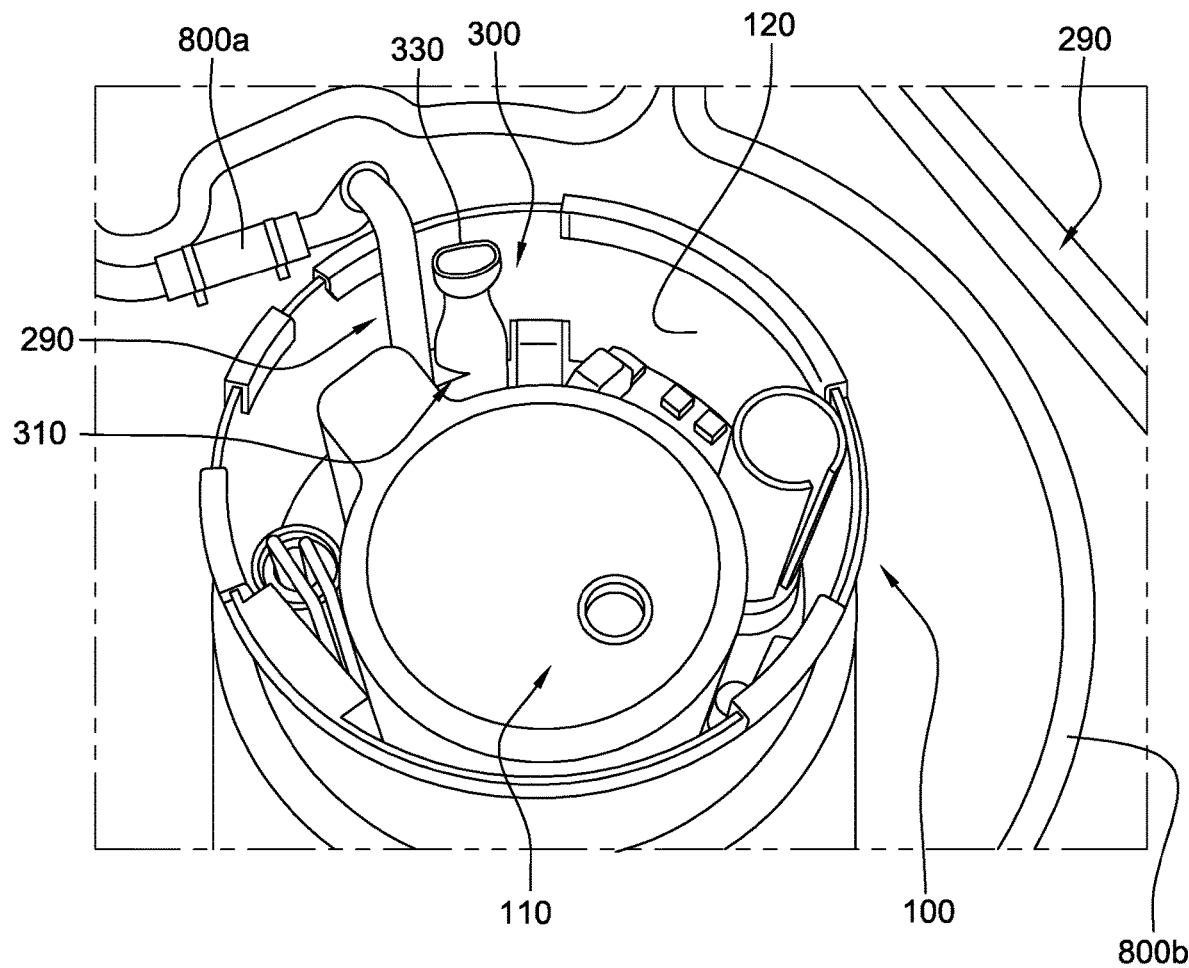

FIGS. 8-10 illustrate a vehicle system for storing an aqueous solution. The vehicle system comprises a first compartment 100 for storing aqueous solution, a second compartment for storing an aqueous solution (only a bottom shell 200a of the second compartment is shown), and a module 400. In this embodiment the second compartment is a tank, and the first compartment 100 is a bowl integrated in module 400, such that the bowl is positioned in the bottom shell 200a of the second compartment. Module 400 is arranged in an opening in a wall of bottom shell 200a. A top shell (not shown) may be provided with a filler pipe for filling the tank, and hence also compartment 100, with aqueous solution. As schematically illustrated in FIG. 11, there may be provided a fill valve 105, e.g. an umbrella valve or a disc valve, in an opening in the first compartment 100, preferably in an opening in the bottom wall 101 of the first compartment 100. The fill valve 105 is configured to allow the aqueous solution L to enter the first compartment 100 during the tank's first fill, whilst it does not allow that aqueous solution leaves the first compartment 100.

Bottom shell 200a has a bottom wall 201 and a sidewall 203a for connection to a top shell (not shown). An opening is arranged in bottom wall 201. In the mounted position of tank, bottom wall 201 corresponds with the lowest face of tank. Module 400 is mounted in the opening in bottom wall 201 of the tank, e.g. by welding or by any other suitable connection means, e.g. using a ring-nut system screwed onto a thread on tank, or using a closure system of the bayonet type.

Module 400 comprises a feed pump unit 110, a jet pump 300 (see FIGS. 9 and 10), and a heater 120. Feed pump unit 110 is connected for pumping aqueous solution L from the first compartment 100 to a feed outlet (not shown but may be similar to the embodiment of FIG. 2). Feed outlet is intended for being connected to a feed line for injecting aqueous solution by an injector, e.g. in an air intake line upstream of a combustion chamber of an internal combustion engine. Alternatively aqueous solution may be injected directly in combustion chamber of the internal combustion engine.

Jet pump 300 has a suction inlet 310, a pressure inlet 320 and an outlet 330. Feed pump unit 110 is further connected for pumping aqueous solution along a flow path extending from an inlet of feed pump unit 110 to an outlet of feed pump unit 110, through jet pump 300, to outlet 330 of jet pump 300. Suction inlet 310 is connected to a suction line 290 arranged for receiving aqueous solution from the second compartment. Outlet 330 of jet pump 300 is arranged for returning aqueous solution from suction inlet 310 and from pressure inlet 320 to first compartment 100. The vehicle system further comprises a controller (not shown) configured for controlling feed pump unit 110. The controller may be configured to pump aqueous solution from the second compartment to first compartment 100 when the level of the aqueous solution in first compartment 100 is below a predetermined level. The controller may be mounted on module 400, but the skilled person understands that it may also be located remotely from module 400.

The pump outlet (not shown) of feed pump unit 110 is preferably located at the bottom of feed pump unit 110. Further, preferably jet pump 300 extends upwardly in module 400, such that the aqueous solution is recirculated upwardly and returned in first compartment 100 at a position which is higher than the pump outlet, and preferably also higher than the pump inlet.

Preferably, the first compartment 100 has the shape of a bowl, e.g. a substantially cylindrical bowl. The bowl may have a diameter between 100 mm and 200 mm, e.g. between 120 and 180 mm. The bowl may have a maximum height between 50 and 100 mm, e.g. between 60 mm and 90 mm. The volume of the tank formed by bottom shell 200*a* and a top shell may be between 5 and 15 liter, e.g. between 8 and 13 liter.

The feed pump unit 110 may comprise a motor 117 (e.g. a BLDC motor) and a gear pump 115.

The heater 120 comprises a heated portion which is provided adjacent the inner wall of first compartment 100. The heater is preferably an electrical heater. In the illustrated embodiment the heater 120 comprises a flexible heater portion arranged against the inner wall of the first compartment, preferably along substantially the entire cylindrical inner wall, optionally with flexible tentacles (not shown) extending in and/or around various areas of the first compartment 100. The bowl 100 may be provided with recesses through which the tentacles 123 extend. However, it is also possible to provide non-flexible electrical heating elements (not shown), e.g. PTC heating elements, attached to or integrated in module 400, e.g. attached to the inside and/or the outside of the first compartment, or in wall elements of first compartment 100. A further heater portion (not shown) may be provided at the bottom of the first compartment, below feed pump unit 110.

Figure 2:
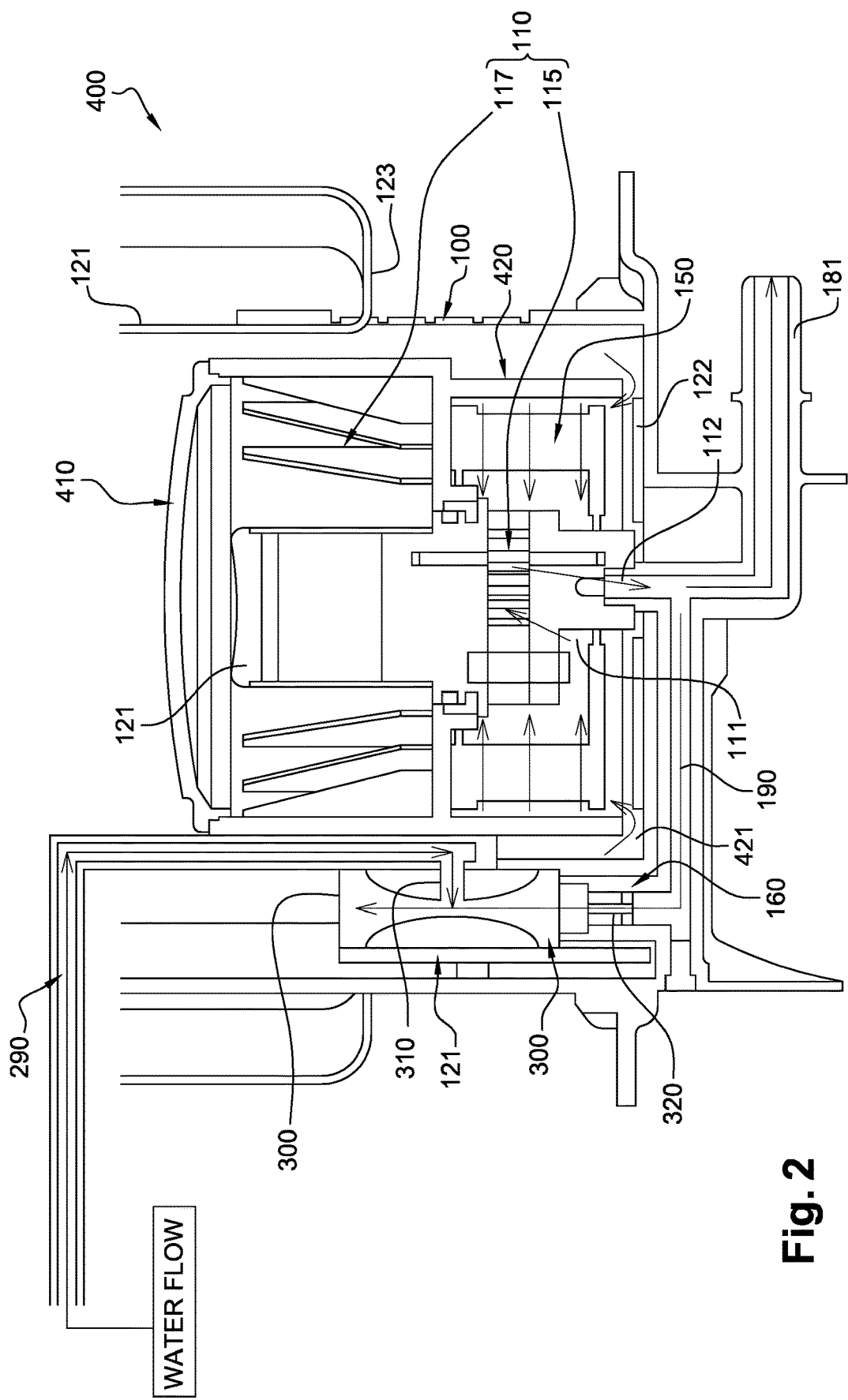
FIG. 2 illustrates a cross section of an exemplary embodiment of a module for use in a vehicle system.

A filter may be integrated in module 400, upstream of feed pump unit 110, as in FIG. 2.

The vehicle system of FIGS. 8-10 further comprises a suction line heating system 800 configured for heating at least a portion of the suction line 290. The suction line heating system 800 comprises a second heater 800*a* arranged around a section of the suction line 290, preferably at least a section of the suction line 290 near and/or in an inner space of the first compartment 100. In the illustrated embodiment the second heater 800*a* extends around a section of the suction line which runs downward from an upper side of the first compartment to the bottom wall 201 of the second compartment. The first heater 120 and/or the second heater 800*a* may be a flexible electrical heater, and the first heater 120 may be connected to the second heater 800*a*.

The suction line heating system 800 further comprises a tubing 800*b* for circulating engine coolant, wherein preferably the tubing 800*b* is arranged at a distance which is smaller than 5 cm from a section of the suction line 290, and more preferably directly adjacent to a section of the suction line 290. For example, the tubing 800*b* may extend over a distance which is larger than 200 mm along a section of the suction line 290.

It is noted that the suction line heating system 800 may also be solely electrical, or solely based on heating by engine coolant.

Preferably, the suction line 290 has a length which is larger than 200 mm, more preferably larger than 300 mm, even more preferably larger than 400 mm. Preferably, a distance between a section of the suction line 290 and a bottom wall 201 of the second compartment is smaller than 5 cm, more preferably smaller than 3 cm; wherein preferably a length of said section of the suction line 290 is larger than 200 mm.

Whilst the principles of the invention have been set out above in connection with specific embodiments, it is to be understood that this description is merely made by way of example and not as a limitation of the scope of protection which is determined by the appended claims.

The invention claimed is:

1. A vehicle system storing an aqueous solution; an air intake line upstream of a combustion chamber of an internal combustion engine; an injector configured for injecting aqueous solution in the air intake line or in the combustion chamber;
    a feed line between a feed outlet and the injector, for feeding said injector with aqueous solution out of a first compartment;
    said vehicle system comprising:
    the first compartment for storing the aqueous solution;
    a second compartment for storing the aqueous solution;
    a suction line arranged for receiving aqueous solution from the second compartment;
    a jet pump having a suction inlet, a pressure inlet and an outlet; and
    a module comprising:
        a feed pump unit connected for pumping aqueous solution from the first compartment to the feed outlet; said feed pump unit being further connected for pumping aqueous solution along a flow path from the first compartment through the feed pump unit, through the pressure inlet of the jet pump to the outlet of the jet pump; and
        a first heater, arranged in a wall delimiting said first compartment, configured and arranged for heating said flow path;
    said suction inlet being connected to said suction line; said outlet of said jet pump being arranged for returning aqueous solution from the suction inlet and from the pressure inlet to the first compartment;
    wherein the second compartment is a tank, and wherein the first compartment is integrated in the module such that the first compartment is located in the second compartment.

2. The vehicle system of claim 1, wherein the jet pump is arranged at least partially in the first compartment.

3. The vehicle system of claim 1, wherein the jet pump is integrated in the module.

4. The vehicle system of claim 1, wherein a non-return valve is included in said flow path, downstream of the feed pump unit.

5. The vehicle system of claim 1, wherein the non-return valve is arranged in a line between an outlet of the feed pump unit and the pressure inlet of the jet pump.

6. The vehicle system of claim 1, wherein the jet pump is arranged in a line extending upwardly in the module.

7. The vehicle system of claim 1, wherein the second compartment is a tank, and wherein the first compartment is integrated in the module such that the first compartment is located in the second compartment.

8. The vehicle system of claim 1, wherein the module is arranged in an opening in a wall of said tank.

9. The vehicle system of claim 1, wherein the tank is provided with a filler pipe.

10. The vehicle system of claim 1, wherein the tank has a bottom wall, a top wall and a sidewall connecting the bottom wall with the top wall, wherein an opening is arranged in the bottom wall, wherein, in a mounted position of the tank, the bottom wall corresponds with a lowest face of the tank, and wherein the module is mounted in the opening in the bottom wall of the tank.

11. The vehicle system of claim 1, wherein the first compartment is an another tank.

12. The vehicle system of claim 11, wherein an overflow line extends between the another tank and the tank, and one of said the tank and the another tank is at a higher level than the other one of said another tank and the tank, wherein said one tank which is at a higher level is provided with a filler pipe.

13. The vehicle system of claim 11, wherein the another tank is provided with a filler pipe and wherein a filler line extends between the filler pipe and the tank.

14. The vehicle system of claim 11, wherein the another tank has a bottom wall, a top wall and a sidewall connecting the bottom wall with the top wall, wherein an opening is arranged in the bottom wall, wherein, in the mounted position of the another tank, the bottom wall corresponds with the lowest face of the another tank, and wherein the module is mounted in the opening in the bottom wall of the another tank.

15. The vehicle system of claim 1, further comprising:
an air intake line upstream of a combustion chamber of an internal combustion engine;
an injector configured for injecting aqueous solution in the air intake line or in the combustion chamber;
a feed line between the feed outlet and the injector, for feeding said injector with aqueous solution out of the first compartment.

16. The vehicle system of claim 1, further comprising a controller configured for controlling the feed pump unit to pump aqueous solution from the second compartment to the first compartment when a level of the aqueous solution in the first compartment is below a predetermined level.

17. The vehicle system of claim 1, further comprising a quality sensor arranged downstream of the jet pump to sense a quality of the aqueous solution leaving the outlet of the jet pump.

18. The vehicle system of claim 1, wherein the module further comprises at least one of a level sensor, a filter, and a bio-decontamination device.

19. The vehicle system of claim 1, further comprising a suction line heating system configured for heating at least a portion of the suction line.

20. The vehicle system of claim 1, wherein the suction line heating system comprises a second heater arranged around a section of the suction line between an inner space of the first compartment and a bottom wall of the second compartment.

21. The vehicle system of claim 20, wherein at least one of the first and the second heater is a flexible electrical heater.

22. The vehicle system according to claim 20, wherein the first heater is connected to the second heater.

23. The vehicle system of claim 19, wherein the suction line heating system comprises a tubing for circulating engine coolant, wherein the tubing is arranged at a distance which is smaller than 5 cm from a section of the suction line.

24. The vehicle system of claim 1, wherein the suction line has a length which is larger than 200 mm.

25. The vehicle system of claim 1, wherein a distance between a section of the suction line and a bottom wall of the second compartment is smaller than 5 cm, and wherein a length of said section of the suction line is larger than 200 mm.

26. The vehicle system of claim 1, wherein at least one of the first compartment has a substantially cylindrical shape with a diameter between 100 mm and 200 mm, and a maximum height between 50 and 100 mm; and a volume of the second compartment is between 5 and 15 liters.

* * * * *